United States Patent [19]

Maya

[11] Patent Number: 5,010,045
[45] Date of Patent: Apr. 23, 1991

[54] LOW-LOSS BINDER FOR HOT PRESSING BORON NITRIDE

[75] Inventor: Leon Maya, Oak Ridge, Tenn.

[73] Assignee: The United States of America as Represented by the United States Department of Energy, Washington, D.C.

[21] Appl. No.: 360,561

[22] Filed: Jun. 2, 1989

[51] Int. Cl.$^5$ .............................................. C04B 35/58
[52] U.S. Cl. ..................................... 501/96; 556/403; 423/290
[58] Field of Search ........................ 501/96; 556/403; 423/290

[56] References Cited

U.S. PATENT DOCUMENTS

| | | | |
|---|---|---|---|
| 3,429,722 | 2/1969 | Economy et al. | 106/55 |
| 4,097,294 | 6/1978 | Rice et al. | 106/43 |
| 4,545,968 | 10/1985 | Hirano et al. | 423/210 |
| 4,562,163 | 12/1985 | Endo et al. | 501/96 |
| 4,581,468 | 4/1986 | Paciorek et al. | 556/403 |
| 4,590,034 | 5/1986 | Hirano et al. | 419/13 |
| 4,676,962 | 6/1987 | Riccitiello et al. | 423/284 |
| 4,707,556 | 11/1987 | Paciorek et al. | 556/403 |
| 4,749,556 | 6/1988 | Parrish et al. | 423/290 |
| 4,784,978 | 11/1988 | Ogasawara et al. | 501/96 |

OTHER PUBLICATIONS

Schwartz et al. "Modeling Density Contributions in Preceramic Polymer/Ceramic Powder Systems", J. Am. Ceram. Soc., 69(5) C-106–C-108 (1986).
Narula et al. "Synthesis of Boron Nitride Ceramics from Poly (borazinylamine) Precursors", J. Am. Chem. Soc. 1987, 109, 5556-5557.
Paciorek, et al. "Boron-Nitrogen Polymers. I. Mechanistic Studies of Borazine Pyrolyses", J. of Polymer Science: Polymer Chem. Ed., vol. 24, 173-185 (1986).
Bender et al., "Evaluation of Potential BN Polymer Precursors", Eng. Sci. Proc 6 [7-8]1171-83 (1985).
Taniguchi, et al., "Preparation of Organoboron Nitride Polymers", 35-Synthetic High Polymers, vol. 105, 1986, 134537a.
Shigeto, et al. "Manufacture of Hexagonal-Crystal Boron Nitride Formed Body", Chemical Abstracts, vol. 107, 1987, p. 382.

*Primary Examiner*—Karl Group
*Attorney, Agent, or Firm*—Katherine P. Lovingood; Stephen D. Hamel; William R. Moser

[57] ABSTRACT

Borazine derivatives used as low-loss binders and precursors for making ceramic boron nitride structures. The derivative forms the same composition as the boron nitride starting material, thereby filling the voids with the same boron nitride material upon forming and hot pressing. The derivatives have a further advantage of being low in carbon thus resulting in less volatile by-product that can result in bubble formation during pressing.

15 Claims, No Drawings

S,010,045

LOW-LOSS BINDER FOR HOT PRESSING BORON NITRIDE

This invention relates to the use of a polymeric binder used in the formation of boron nitride ceramics, particularly the use of a boron and nitrogen containing polymer that when pyrolyzed will produce boron nitride and when mixed with boron nitride and shaped into a desired configuration will result in a pure, dense boron nitride structure upon heating. The invention was developed pursuant to a contract with the United States Department of Energy.

BACKGROUND OF THE INVENTION

Advanced ceramic materials such as carbides, nitrides, borides and silicides have very high melting points and are relatively chemically inert. These characteristics impose difficulties in the formation of compact final shapes and their preparation requires high temperatures and pressures. Use of sintering aids, typically oxides, is limited since these usually contaminate the final product and degrade the mechanical and chemical characteristics of the final form.

The use of polymeric compounds as precursors for formation of ceramics is a generalized procedure that has the potential of affording control over the composition and morphology of a variety of advanced ceramic materials. Previously silicon carbide fibers have been made by heat treatment of a polycarbosilane polymeric precursor. Also, boron nitride has been made using polymeric materials containing boron and nitrogen such as aminoboranes and borazines. However, there is a continuing need to find new polymers to use not only as precursors but also as low-loss binders for binding powder starting material.

SUMMARY OF THE INVENTION

In view of the above needs, it is an object of this invention to provide a polymeric borazine derivative that can be used as a precursor or binder in the making of boron nitride compositions.

It is another object of this invention to provide a process for preparing polymeric borazine derivative that is relatively inexpensive and easy.

An additional object of this invention is to provide a process for making boron nitride compositions using polymeric borazine derivatives as binders.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the composition of this invention may comprise a polymeric borazine derivative that decomposes to form boron nitride. The invention may further comprise a process for making the polymeric borazine derivative wherein bis-trimethylsilylacetylene is mixed with a chloroborazine in the presence of a Lewis acid catalyst. This mixture is heated for a sufficient length of time for the reaction to take place. The invention may also comprise a process for making boron nitride ceramic by mixing the polymeric borazine derivative and boron nitride powder, pressing the mixture and heating to drive off the volatiles, resulting in a pure boron nitride ceramic composition that is more dense than similar ceramics made using conventional methods.

The advantage of using the polymeric borazine derivatives of this invention is the simplicity by which they are made and the fact that they form boron nitride upon heating, thereby leaving no impurities resulting from the binder.

DETAILED DESCRIPTION OF THE PREFERRED EMBODIMENT

The present invention relates to the use of a binder that upon pyrolysis generates the same ceramic material as the bulk composition. In theory, infiltration of a ceramic precursor polymer into the voids of a packed powder followed by or concurrent with pyrolysis leaves a residue that fills some of the void resulting in denser final form at temperatures and pressures much lower than the alternative binderless hot pressing and sintering.

Sintering, a phenomenon that occurs during heat treatment of particulates, is caused by diffusion at surfaces and has the effect of closing pores and thus it produces densification. Sintering aids optimize this process by preventing crystal growth which would be detrimental to densification and to the mechanical strength of the final object. Unlike sintering, the process of this invention achieves densification by filling the pores among the particles. It is conducted at lower pressures and temperatures than sintering treatments. While sintering achieves densification by closing pores from within, the process of the invention closes pores by an outside additive at temperatures lower than those required for sintering.

This invention uses a boron- and nitrogen-containing polymer to fill the voids when the powder is densified. Other boron and nitrogen promoters such as melamine have been used previously; however, their carbon content is a problem. Polymeric borazine is an attractive substitute since the presence of boron and nitrogen are maximized and the presence of carbon is minimized. In addition, the compound is easy to prepare and its decomposition is clean, leaving $(CH_3)_3SiCl$ as the only volatile byproduct. The smaller amount of volatile byproduct means less chance of bubbling and void formation.

The precursor can be prepared simply by mixing bis-trimethylsilylacetylene with dichloroborazine or trichloroborazine in the presence of about 2 wt % of a catalyst such as aluminum chloride; and heating in an inert atmosphere to about 100° C. for a sufficient time for the reaction to take place, about 6 hours. It is important not to let the reaction go too long or else an unmanageable product may result. A hydrogen substituted linear product results if dichloroborazine is used, and a chlorine substituted polymer network results if trichloroborazine is used. Trichloroborazine is much easier to use and, thus, the preferred starting material.

The preparation follows the reactions of Equations 1 and 2, using trichloroborazine and dichloroborazine, respectively.

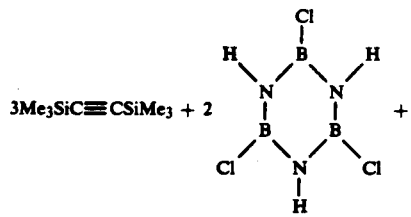

Equation 1

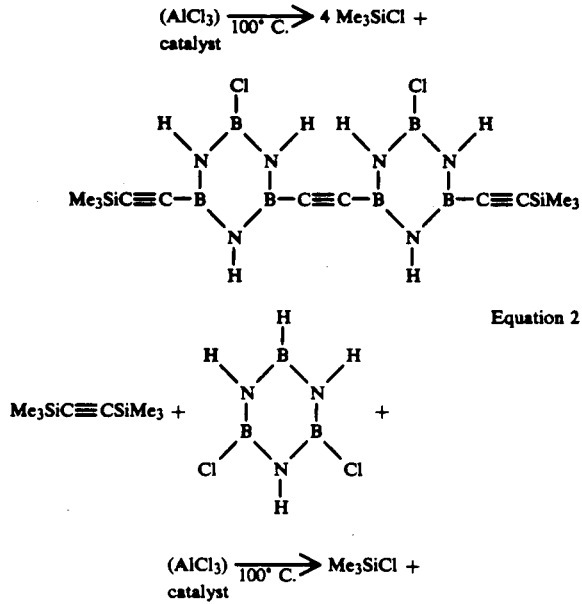

Equation 2

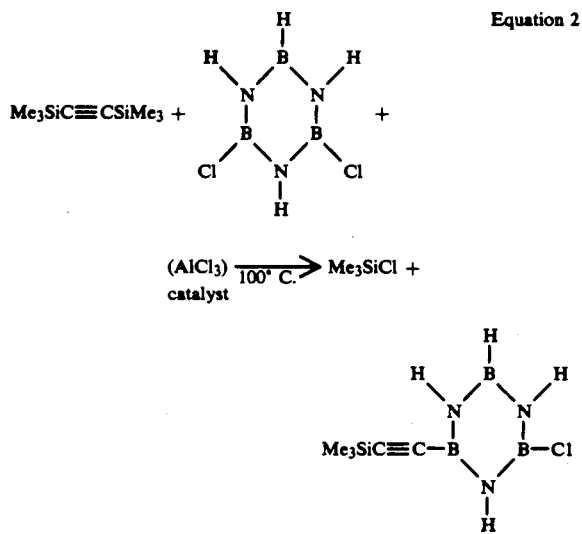

The equations as written represent a stage in the conversion of the reactants corresponding to 66% for trichloroborazine and 50% for dichloroborazine. These reaction mixtures are useful as binders at lower conversions up to the limits of 66% and 50%, respectively, where solubility is preserved. Higher conversions produce insoluble materials which can, alternatively, be used as precursors for powder boron nitride. The systems have the potential to form infinite polymeric networks which are eventually formed during the pyrolysis step by completing the conversion to 100%, thus driving out all the remaining Me₃SiCl in the system.

To form the boron nitride ceramic object, the precursor and commercially available BN powder are mixed, with precursor constituting about 20–30% of the mix. This mixture can be molded, extruded or otherwise formed and shaped; and then subjected to heat and pressure, the parameters of which are dependent on size, shape and desired properties of the finished product or article. Temperature and pressure parameters can be readily ascertained by a person skilled in the art. Generally, heat is increased sufficiently to effect pyrolysis, to about 800° C. or higher, and pressure can be increased as high as the dye can physically withstand.

To use the composition of this invention as a precursor instead of a binder, merely eliminate the boron nitride powder from the process. Although the composition can be used as a precursor, it is more likely that it will be used as a binder since BN powder is commercially available, and therefore easier to obtain that the starting material which must be made.

EXAMPLE

A 1039 mg portion of Me₃SiC≡CSiMe₃ equivalent to 6.097 mmole and 736 mg of trichloroborazine equivalent to 4.005 mmole and 33 mg AlCl₃ were sealed under vacuum in a heavy walled glass ampule. The ampule was allowed to stand overnight and then heated to 100° C. for 6 h. The ampule was cooled and opened into a vacuum line and subjected to dynamic vacuum to collect the volatile product Me₃SiCl in a trap cooled with liquid nitrogen (−196° C.). 7.46 mmole of Me₃SiCl were collected corresponding to a 61.10% conversion. The solid residue was recovered obtaining 895 mg of precursor. The material was shown to be readily soluble in toluene.

The precursor eliminates additional trimethylsilylchloride upon pyrolysis to 800° C. leaving a residue that shows the following chemical analysis in wt %: C 30.8, H 0.9, N 30.7, B 23.3, Cl 4.9, Si 3.8. This material shows the typical IR spectrum of boron nitride.

Mixtures of the precursor and commercial boron nitride powder were prepared and compressed under 4000 psi while being pyrolyzed under a vacuum to 800° C. The apparent density of the resulting pellets was established from measurements of the external dimensions and weight of each specimen.

A series of experiments with different compositions showed that plain boron nitride powder was densified to 1.59 g/cc, that is 70% of the theoretical density of hexagonal boron nitride which is 2.26 g/cc. A density of 1.64 g/cc was observed on a mixture that retained 4.1% of the boron nitride derived from the precursor. Similarly, densities of 1.80, 1.79 and 1.70 g/cc were observed at residue concentrations of 11.8, 18.2 and 25%, respectively. From these data, it is deduced that a loading producing a residue of about 13% would yield a density of 1.82 g/cc corresponding to 80.5% of the theoretical density. This considerably higher density is achieved under relatively mild conditions of temperature and pressure because of the use of a low-loss binder that yield, on pyrolysis, the same material as the bulk powder. From these tests it was determined that the optimum wt % of the binder in the starting mixture is from 20 to 30%.

I claim:

1. A composition consisting essentially of

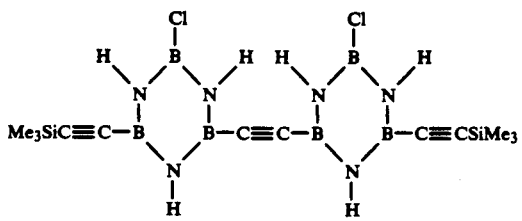

2. A composition consisting essentially of

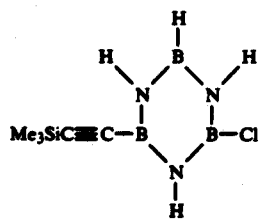

3. A polymeric borazine derivative useful as a binder in the formation of boron nitride ceramics, consisting essentially of the product of a reaction mixture of bis-trimethylsilylacetylene and a chloroborazine in the presence of a Lewis acid and sufficient heat to cause a reaction.

4. The derivative of claim 3 wherein said Lewis acid is AlCl$_3$.

5. The derivative of claim 3 wherein said chloroborazine consists essentially of dichloroborazine.

6. The process of claim 3 wherein said chloroborazine consists essentially of trichloroborazine.

7. A process for making a polymeric borazine derivative useful as a binder in the formation of boron nitride ceramics, comprising: mixing bis-trimethylsilylacetylene and a chloroborazine in the presence of a Lewis acid catalyst;
heating said mixture to a sufficient temperature for a sufficient length of time for the reaction to take place.

8. The process of claim 7 wherein said Lewis acid is AlCl$_3$.

9. The process of claim 7 wherein said chloroborazine is consists essentially of dichloroborazine.

10. The process of claim 7 wherein said chloroborazine is consists essentially trichloroborazine.

11. The process of claim 7 wherein said derivative consists essentially of

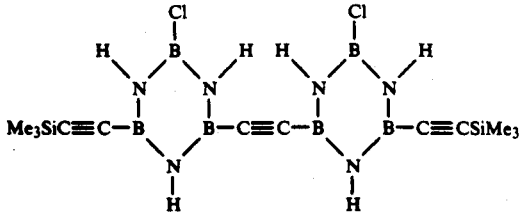

12. The process of claim 7 wherein said derivative consists essentially of

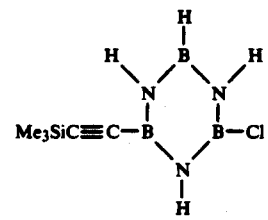

13. A process for making boron nitride ceramic comprising:
mixing the polymeric borazine derivative of claim 11 and boron nitride powder;
pressing said mixture and heating to drive off the volatiles, resulting in a pure boron nitride ceramic composition.

14. A process for making boron nitride ceramic comprising:
mixing the polymeric borazine derivative of claim 2 and boron nitride powder;
pressing said mixture and heating to drive off the volatiles, resulting in a pure boron nitride ceramic composition.

15. A process for making boron nitride ceramic comprising:
mixing the polymeric borazine derivative of claim 3 and boron nitride powder;
pressing said mixture and heating to drive off the volatiles, resulting in a pure boron nitride ceramic composition.

* * * * *